(12) United States Patent
Yoon et al.

(10) Patent No.: US 8,925,048 B2
(45) Date of Patent: Dec. 30, 2014

(54) SECURITY METHOD OF MOBILE INTERNET PROTOCOL BASED SERVER

(75) Inventors: Ho Sun Yoon, Daejeon (KR); Ho Yong Ryu, Daejeon (KR); Sung Back Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 797 days.

(21) Appl. No.: 12/678,812

(22) PCT Filed: Mar. 26, 2008

(86) PCT No.: PCT/KR2008/001685
§ 371 (c)(1),
(2), (4) Date: Mar. 18, 2010

(87) PCT Pub. No.: WO2009/038260
PCT Pub. Date: Mar. 26, 2009

(65) Prior Publication Data
US 2010/0262825 A1   Oct. 14, 2010

(30) Foreign Application Priority Data

Sep. 18, 2007 (KR) ........................ 10-2007-0094721
Mar. 25, 2008 (KR) ........................ 10-2008-0027271

(51) Int. Cl.
*H04L 29/06* (2006.01)
*H04W 12/06* (2009.01)
*H04W 12/04* (2009.01)

(52) U.S. Cl.
CPC .............. *H04W 12/06* (2013.01); *H04W 12/04* (2013.01); *H04L 63/0869* (2013.01); *H04L 63/06* (2013.01); *H04L 63/0281* (2013.01)
USPC .............................. 726/5; 713/169; 713/171

(58) Field of Classification Search
USPC ....................... 713/169, 171; 726/5
See application file for complete search history.

(56) References Cited

U.S. PATENT DOCUMENTS

2002/0194478 A1    12/2002  MacKenzie
2004/0030659 A1*    2/2004  Gueh ............................. 705/67

(Continued)

FOREIGN PATENT DOCUMENTS

JP    2002-335238 A    11/2002
JP    2004-260401 A     9/2004

(Continued)

OTHER PUBLICATIONS

Victor Boyko et al., "Provably Secure Password-Authenticated Key Exchange Using Diffie-Hellman," EuroCrypt 2000, 2000, pp. 157-172.

(Continued)

*Primary Examiner* — Michael Pyzocha (57) ABSTRACT

A security method in a server-based mobile IP system is provided. Specifically, in the security method, general data is securely exchanged in addition to a control message that is exchanged between a mobile node and a server or between mobile nodes. Specifically, provided is a method of securely exchanging data by using a mobile node including an mPAK execution module generating necessary keys by exchanging key information with the server while performing a mutual authentication process and negotiating the security policy; and a security module setting a security policy that is negotiated with the corresponding node and applying the security policy to data according to the set security policy when transmitting the data.

14 Claims, 6 Drawing Sheets

(56) References Cited

U.S. PATENT DOCUMENTS

| | | |
|---|---|---|
| 2005/0210252 A1 | 9/2005 | Freeman et al. |
| 2006/0069916 A1* | 3/2006 | Jenisch et al. ............... 713/172 |
| 2006/0085643 A1 | 4/2006 | Philips |
| 2007/0058632 A1* | 3/2007 | Back et al. .................... 370/392 |
| 2007/0133803 A1 | 6/2007 | Saito et al. |
| 2007/0177550 A1 | 8/2007 | Kwon et al. |
| 2007/0186100 A1* | 8/2007 | Wakameda ................... 713/160 |
| 2010/0138908 A1* | 6/2010 | Vennelakanti et al. ......... 726/11 |

FOREIGN PATENT DOCUMENTS

| | | |
|---|---|---|
| JP | 2005-269656 A | 9/2005 |
| KR | 1020010027902 A | 4/2001 |
| KR | 1020040050740 A | 6/2004 |
| KR | 1020040090020 A | 10/2004 |
| KR | 1020050041820 A | 5/2005 |
| KR | 1020070059902 A | 6/2007 |

OTHER PUBLICATIONS

Kang-Kyu Lim et al., "A Study on the BU (Binding Updates) Authentication Methods in Mobile IPv6," Conference on Information Security and Cryptology—Winter, pp. 60-65, vol. 13, No. 2, Jan. 1, 2003.

Jungdu Koo et al., "A Study on the BU (Binding Updates) Methods in Mobile IPv6," Korea Institute of Information Security and Cryptology, pp. 99-111, vol. 16, No. 1, Feb. 2006.

Ho-Sun Yoon et al., "PAK-based Binding Update Method for Mobile IPv6 route optimization," 2006 International Conference on Hybrid Information Technology (ICHIT'06), Nov. 2006, pp. 617-622, vol. 2, IEEE.

International Search Report for PCT/KR2008/001685 filed on Mar. 26, 2008.

Written Opinion of the International Searching Authority for PCT/KR2008/001685 filed on Mar. 26, 2008.

* cited by examiner

SECURITY METHOD OF MOBILE INTERNET PROTOCOL BASED SERVER

TECHNICAL FIELD

The present invention relates to a security method in a server-based Internet protocol (IP) system, and more particularly, to a security method for securely exchanging general data in addition to a control message that is exchanged between a mobile node and a server or between mobile nodes.

The present invention is supported by the IT R&D program of MIC/IITA[2007-S-013-01, R&D on all IPv6 based Fixed-Mobile convergence networking technology].

BACKGROUND ART

General methods used to protect data that is exchanged between two nodes are an IP security protocol (IPSEC) method and a transport layer security (TLS) method. The IPSEC method is essential for security of a control message in a mobile IP that is suggested by the Internet Engineering Task Force (IETF). An IPSEC is constructed with an Internet key exchange (IKE) for performing a key exchange function in a user area, an authentication header (AH) for protecting data in a kernel area, and an encapsulating security payload (ESP). Since a message is protected from an IP header, it is impossible to protect data for each service application or to apply quality of service (QoS). On the contrary, in the TLS method, it is possible to protect data for each application, and however, it is impossible to perform a security function for the IP header.

In order to protect data, the two nodes have to share the same key information. In order to share the same key between the two nodes, the IPSEC uses the IKE, and the TLS uses a key exchange function of its own. A mutual authentication process between the two nodes is essential to perform the key exchange function. A certificate is mainly used for this mutual authentication process. That is, a key is necessary for security of data. The certificate is needed so as to exchange the key. A security infrastructure such as a public key infrastructure is needed so as to manage the certificate. In addition, since the key exchange protocol has a considerably complex structure, it is difficult to apply the key exchange protocol to a wireless environment.

DISCLOSURE OF INVENTION

Technical Problem

The present invention provides a method of protecting various messages to be exchanged between nodes through a key exchange method suitable for a wireless environment by using a simple protocol without a certificate in a server-based mobile IP system.

The present invention also provides a filtering function in addition to a message security function by supporting a 5-tulpes lookup process so as to protect a message.

Technical Solution

According to an aspect of the present invention, there is provided a security method of a mobile node in a server-based mobile IP system, the security method comprising: generating a tunnel with a server by using a first security component exchanged by performing a mobile password-based authentication key exchange (mPAK) process with the server; transmitting a pseudo password query message (PPQ) to the server through the generated tunnel; exchanging a second security component by performing the mPAK process with a destination node by using a pseudo password acknowledgement message (PPA) received from the server in response to the PPQ; and generating a tunnel for security of data and a control message that is transmitted and received to and from the destination node by using the second security component.

According to another aspect of the present invention, there is provided a security method of a mobile node in a server-based mobile IP system, the security method comprising: generating a tunnel by using security components that are exchanged by performing a mPAK process with a plurality of mobile nodes; receiving a PPQ from at least one mobile node through the generated tunnel; and transmitting a pseudo password, which is generated as a random number is generated, to the mobile node when receiving the PPQ.

According to another aspect of the present invention, there is provided a mobile node device in a server-based mobile IP system, the mobile node device comprising: an mPAK execution module generating necessary keys by exchanging key information with the server while performing a mutual authentication process and negotiating the security policy; and a security module setting a security policy that is negotiated with the corresponding node and applying the security policy to the data according to the set security policy when transmitting data.

Advantageous Effects

As described above, in the server-based mobile IP system, it is possible to reduce a large amount of operations and the number of processes of exchanging messages and to perform a secure communication process in a mobile node having low power and computational capability by using a simple protocol without using an infrastructure such as an authentication center so as to exchange a key.

In addition, it is possible to apply a security policy for each application by determining a security policy through a 5-tuple lookup process and to perform a function of a simple fire wall by applying a packet filtering technique.

BEST MODE FOR CARRYING OUT THE INVENTION

The present invention will now be described more fully with reference to the accompanying drawings, in which exemplary embodiments of the invention are shown. In the description of the present invention, if it is determined that a detailed description of commonly-used technologies or structures related to the invention may unnecessarily obscure the subject matter of the invention, the detailed description will be omitted.

In an embodiment of the present invention, a mobile password-based authenticated key exchange (hereinafter, referred to as mPAK) process is used. The mPAK process indicates a process of exchanging a key by using a password. In the mPAK process, it is possible to securely exchange a key without a security infrastructure such as a public key infrastructure (PKI). That is, when a mobile node is turned on or when a mobile service is to be used, in a server-based mobile IP system, a key is exchanged between a mobile node and a server by allowing a user to input an ID and a password. Thus, a message is protected by using the exchanged key. Here, the exchanged key is available until the mobile node is turned off or until the mobile service is stopped.

A security method for protecting control messages in a server-based mobile IP system will be described with reference to the attached drawings. First, a procedure of exchanging a key by using the mPAK process in the server-based mobile IP system will be described.

Figure 1:
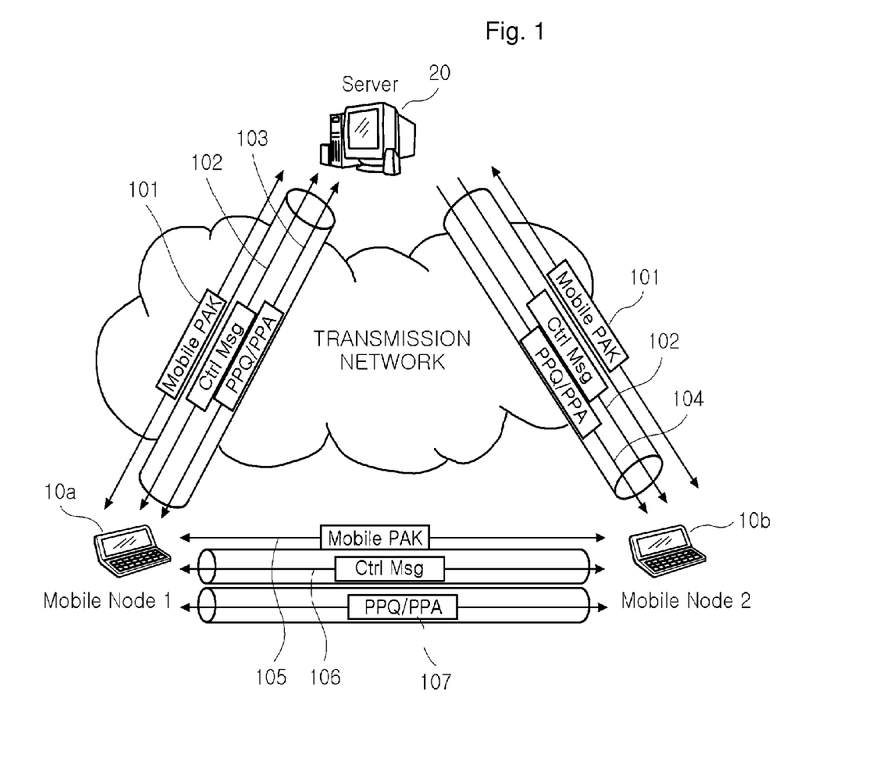
FIG. 1 illustrates security procedures between a node and a server and between nodes in a server-based mobile IP system according to an embodiment of the present invention.

FIG. 1 illustrates security procedures between a mobile node and a server and between mobile nodes in a server-based mobile IP system according to an embodiment of the present invention.

Referring to FIG. 1, in the server-based mobile IP system, mobile nodes 10a and 10b exchange security components by performing the mPAK process with a server 20 and generate secure tunnels by using the exchanged security components (operation 101). When the secure tunnels are generated, the mobile nodes 10a and 10b and the server 20 transmit and receive a control message while sharing information according to a message security method (operation 102).

As described above, after a security procedure is performed between the mobile nodes 10a and 10b and the server 20, a procedure of communicating data between the mobile nodes may be performed. A local node 10a which desires to communicate data transmits a pseudo password query (PPQ) message to the server 20 so as to set a secure tunnel with a remote node 10b that is a destination node of data communication (operation 103).

The server 20 generates a pseudo password according to the PPQ of the local node 10a and transmits the pseudo password to the local node 10a and the remote node 10b (operations 103 and 104).

When the pseudo password is received from the server 20, the secure tunnel between the local node 10a and the remote node 10b is generated by performing the mPAK process by using the received pseudo password (operation 105). When the secure tunnel between the local node 10a and the remote node 10b is generated, data and a control message are exchanged through the tunnel generated between the two nodes (operation 106 and 107).

Figure 2:
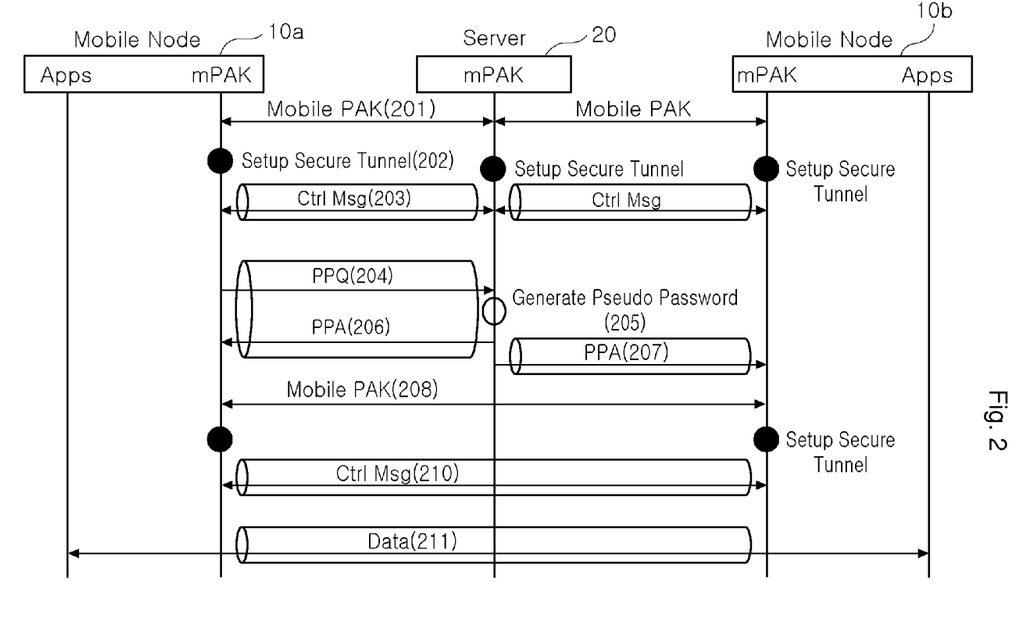
FIG. 2 illustrates the security procedures of FIG. 1 in detail.

FIG. 2 illustrates the security procedures of FIG. 1 in detail. The aforementioned security procedure will be described in detail with reference to FIG. 2.

In a case where each of the mobile node 10a and 10b is turned on or a case where a user who desires to receive a mobile service exists, the user inputs an identification (ID) and a password (PW). When the ID and the PW are input by the user, first and second mobile nodes 10a and 10b exchange information for setting a secure tunnel between the first mobile node 10a and the server 20 and information for setting a secure tunnel between the second mobile node 10b and the server 20 by performing the mPAK process with the server 20, respectively (operation 201). Specifically, the mobile nodes 10a and 10b negotiate security policies and components required so as to exchange a key, mutually authenticate each other, and set secure tunnels by performing the mPAK process with the server 20.

Information on the key to be exchanged through the mPAK process becomes a seed of the key. Various keys may be generated by using the key seed. However, the various keys may be generated through various known methods.

In addition, information that is shared by the mobile nodes 10a and 10b and the server 20 through the negotiation may be applied in various manners according to the message security method. For example, in a case where an authentication header (AH) and an encapsulating security payload (ESP) of an IP security protocol (IPSEC) are used, it is necessary to negotiate information for setting security association according to a security policy. Setting of security association according to the security policy indicates setting of a security policy database (SPD) for a secure tunnel and a security association database (SAD).

Here, security parameter indices (hereinafter, referred to as SPI), an address and a port number of a source, an address and a port number of a destination, information on whether the AH and the ESP are used, information on whether a mode is a transport mode or tunnel mode, a cipher/decipher algorithm and key, an authentication algorithm and key are necessary so as to set the security association.

When an exchange of the information for generating the secure tunnel is completed by performing the mPAK process between the mobile nodes 10a and 10b and the server 20, a security tunnel is set between the mobile nodes 10a and 10b and the server 20 (operation 202).

When secure tunnels between the mobile nodes 10a and 10b and the server 20 are generated, subsequent control messages to be exchanged between the mobile nodes 10a and 10b and the server 20 are transmitted through the secure tunnels (operation 203). The secure tunnels may be separately generated according to types of control messages. Alternatively, only a secure tunnel may be generated regardless of the types of control messages.

When information to be protected exists in an IP header of a control message to be exchanged between the mobile nodes 10a and 10b and the server 20 through the generated security tunnels, a security function is performed by using the AH and the ESP of the IPSEC. Alternatively, when information to be protected does not exist in the IP header, various types of security methods may be applied if necessary. For example, if only authentication of a control message to be exchanged is necessary, a tunnel may be set through a Keyed Hash method. In addition, a tunnel may be set so as to perform an authentication function, a cipher function, and a decipher function if necessary. However, the type of control messages to be exchanged may be determined if necessary. Here, the type of control messages is not additionally described.

In a case where the first mobile node 10a desires to communicate data with the second mobile node 10b after a secure tunnel is generated, the first mobile node 10a transmits a pseudo password query (PPQ) message to the server 20 through the generated secure tunnel (operation 204). At this time, the PPQ message includes an address of a destination node with which data is to be communicated. Here, the destination node indicates the second mobile node 10b.

When the server receives the PPQ message from the first mobile node 10a, the server generates a pseudo password which is used instead of a password that is an input parameter of the mPAK process (operation 205). Specifically, the server generates a random number according to a request of the first mobile node 10a and generates a pseudo password by using the generated random number. Here, a method of generating the random number may be a general random number generation method. In addition, the requested pseudo password includes a pseudo ID and a pseudo password.

The server 20 transmits a pseudo password acknowledgement message (PPA) including the pseudo password generated through the generated secure tunnel to the first mobile node 10a after generating the pseudo password (operation 206) and transmits the PPA including the generated pseudo password to the second mobile node 10b that is the destination node (operation 207).

A message exchanged for each node may be defined according to a message security method. For example, in a case where a message security method is the IPSEC, items such as various available security algorithms, a type for distinguishing ESP/AH, a mode for distinguishing a transport/tunnel mode, and the like are included in the message $MSG_R$, $MSG_L$, and $MSG_N$ and negotiated.

TABLE 1

| Local Node | Remote Node |
|---|---|
| $x \in_R Z_q$<br>$m = g^x \bmod P$<br>$X = m \cdot H[LA\|RA\|ID\|PW]$ | |
| | $\xrightarrow{ID, X}$ |
| | $y \in_R Z_q, \mu = g^y \bmod P$<br>$\sigma = \left(\dfrac{X}{H[LA\|RA\|ID\|PW]}\right)^y \bmod P$<br>$= g^{xy} \bmod P$ |
| | $\xleftarrow{ID, Y, MSG_R, AUTH_R}$ $K_{seed} = H[LA\|RA\|ID\|PW\|m\|\mu\|\sigma]$<br>$K_A = PRF[K_{seed}\|\sigma\|ID\|PW\|0]$<br>$Y = \mu \cdot H[LA\|RA\|ID\|PW]$<br>$AUTH_R = KH[ID\|Y\|MSG_R]_{K_A}$ |
| $\sigma = \left(\dfrac{Y}{H[LA\|RA\|ID\|PW]}\right)^x \bmod P$<br>$= g^{xy} \bmod P$<br>$K_{seed} = H[LA\|RA\|ID\|PW\|m\|\mu\|\sigma]$<br>$K_A = PRF[K_{seed}\|\sigma\|ID\|PW\|0]$<br>Verify $AUTH_R$<br>$AUTH_L = KH[ID\|MSG_L]_{K_A}$ | $\xrightarrow{ID, MSG_L, AUTH_L}$ Verify $AUTH_L$ |
| Verify $AUTH_N$ | $\xleftarrow{ID, MSG_N, AUTH_N}$ $AUTH_N = KH[ID\|MSG_N]_{K_A}$ |

At this time, the PPA transmitted from the server 20 to the first and second mobile nodes 10a and 10b includes information on the generated pseudo ID and the pseudo password.

The first and second mobile nodes 10a and 10b perform the mPAK process by using the pseudo password transmitted from the server for secure communication (operation 208). Here, the mPAK process is the same as the mPAK process performed by using a password between the aforementioned mobile nodes and the server.

A secure tunnel for securely exchanging data and control messages is generated between the first and second mobile nodes 10a and 10b after performing the mPAK process (operation 209).

Accordingly, the first and second mobile nodes 10a and 10b exchange a control message through a secure tunnel (operation 210) and exchange data to be exchanged between applications (operation 211).

The mPAK process is performed through an mPAK protocol shown in Table 1. Hereinafter, Table 1 will be described in detail.

Brief description on symbols shown in Table 1

H[ ]: Hash function

LA∥RA∥ID∥PW: Local address∥Remote address∥ID∥password (∥ indicates concatenation).

PRF[ ]: pseudo random number generation function

KH[ ]$_K$: Keyed Hash by using key K

A procedure of exchanging a key according to the mPAK protocol will be described in detail.

A local node which initially desires to exchange a key selects a random number x and calculates X by using the selected random number. At this time, the random number x is used to generate a key as secret information.

A remote node which receives information searches for a password by using the received ID. It is assumed that information on the ID and the password is previously known by the local node through a previous procedure. The remote node selects a random number y, calculates and, and calculates a seed $K_{seed}$ that is used to generate a key by using the calculated information. A key $K_A$ for applying the Keyed Hash to a message $MSG_R$ is calculated, and $AUTH_R$ is calculated by using the calculated information. Here, the message $MSG_R$ may include various types of information according to a security method.

If the applied security method is IPSEC, the $MSG_R$ includes the following information.

$MSG_R$=[cipher_alg_num, cipher_alg_list, mac_alg_num, mac_alg_list, type, mode, proto, dhGroup, SPI, local_addr_v4, local_addr_v6]

The $MSG_R$ includes a list of various security algorithms which can be supported by the remote node. Here, cipher_alg_num indicates the number of available cipher algorithms, cipher_alg_list indicates a list of available cipher algorithm, mac_alg_num indicates the number of available authentication algorithms, and mac_alg_list indicates a list of available authentication algorithms. The $MSG_R$ includes information on items such as type for distinguishing ESP/AH, mode for distinguishing a transport/tunnel mode, proto for indicating a protocol, dhGroup for indicating a Diffie-Hallman group, SPI for distinguishing SA, and the like. In addition, local_addr_v4 and local_addr_v6 indicate an IPv4 address and an IPv6 address of the remote node, respectively.

In addition, a security method in which the $MSG_R$ includes the following information may be applied.

$MSG_R$=[cipher_alg_num, cipher_alg_list, mac_alg_num, mac_alg_list, local_addr_v4, local_addr_v6]

A local node which receives a message from a remote node calculates by using secret information x, calculates a key seed $K_{seed}$ and a key $K_A$ for authentication, and verifies the received $AUTH_R$. If the verification is successful, a message $MSG_L$ is generated, and $AUTH_L$ is calculated by using the authentication key $K_A$.

Here, the generated message $MSG_L$ may be differently applied according to a security method.

For example, in a case where, the security method is the IPSEC, the message $MSG_L$ is represented as follows.

$MSG_L$=[cipher_alg, mac_alg, type, mode, SPI]

An algorithm having a high priority is determined by comparing a list of security algorithms obtained from the $MSG_R$ that is received from the remote node with a list of algorithms which can be supported by the $MSG_R$ and transmitted to the remote node.

In addition, the $MSG_L$ may include the following information according to another security method.

$MSG_L$=[cipher_alg_num, cipher_alg_list, mac_alg_num, mac_alg_list, sp_num, sp_info[action, proto, dport, sport, cipher_alg, mac_alg]]

At this time, the message $MSG_L$ includes information on various available security algorithms and information on a security policy. Here, meanings of cipher_alg_num, cipher_alg_lit, mac_alg_num, and mac_alg_list are the same as those in the $MSG_R$. Here, sp_num indicates the number of security policies. The security policies includes items such as action for indicating add/delete, proto for indicating a protocol, dport for indicating a destination port number, sport for indicating a source port number, cipher_alg for indicating a cipher algorithm, mac_alg for indicating an authentication algorithm, and the like. The cipher algorithm and the authentication algorithm are determined according to priorities among security algorithms which can be supported by both nodes by comparing algorithms that can be supported by the remote node with algorithms that can be supported by the local node.

The remote node verifies the received $AUTH_L$. When the verification is successful, information on whether the verification is successful is transmitted to the local node through the message $MSG_N$.

Next, in a case where the security method is the IPSEC, the message $MSG_N$ is represented as follows.

$MSG_N$=[result]

In addition, in a case where another security method is used, the message $MSG_N$ may include the following information.

$MSG_N$=[sp_num, sp_info[action, proto, dport, sport, cipher_alg, mac_alg]].

Here, a meaning of each field is the same as that of $MSG_L$.

The messages $MSG_R$, $MSG_L$, and $MSG_N$ may include various types of information according to a security method applied to a message in a security module.

After performing a procedure shown in Table 1, the two nodes can share the key seed K and generate various types of keys by using the key seed. Since methods of seed generating various keys by using a key seed are known, the methods are not described in this specification.

Figure 3:
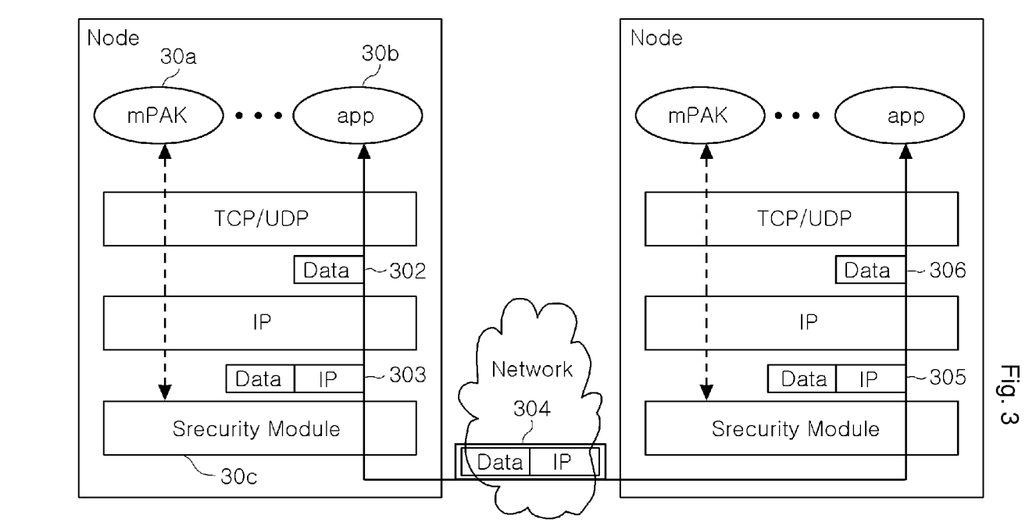
FIG. 3 illustrates a detailed method of executing a security process of data according to an embodiment of the present invention.

FIG. 3 illustrates a detailed method of executing security of data according to an embodiment of the present invention.

Each node shares a key through an mPAK protocol 30a so as to transmit data and a control message through a secure tunnel between the two nodes and includes a security module 30c which applies a security policy to transmitted and received data.

In FIG. 3, the mPAK protocol 30a indicates a protocol for performing an exchange of a key, and App(3b) indicates various types of applications.

As shown in FIG. 3, the security module 30c which practically applies a security policy to data may separately operate. Alternatively, the security module 30c may be included in a Layer 2 network device driver. The security module 30c which applies the security policy to data may determine whether to accept received data through a 5-tuple lookup process. This data filtering function is the same as a simple fire wall function.

In order to transmit and receive data and a control message between the two nodes according to the security policy, key information is exchanged by performing the mPAK 30a by using an input password, and information related to the security policy is transmitted to the security module 30c.

Information transmitted to the security module 30c may include information on cipher/decipher and authentication algorithms, a key, a sequence number for preventing a replay attack, an information generation time, a life time, and the like. An index for searching for this information includes an address and a port number of a destination, an address and a port number of a source, and a protocol number. The method of performing the 5-tuple lookup process in the security module 30c may be selected from previously reported methods. The method of performing the 5-tuple lookup process is not described in detail in this specification.

In a case where data is exchanged between applications that exist in the two nodes through a secure tunnel generated by performing the mPAK 301, the exchanged data passes the security module 30c after passing through a TCP/UDP layer 302 and an IP layer 303 and applies the security policy received from the mPAK 30a to corresponding data. The data 304 to which the security policy is applied is transmitted to the destination node through a public network.

When receiving data transmitted through the public network, the destination node processes the data in the reverse order of the process in the node that transmits the data.

Figure 4:
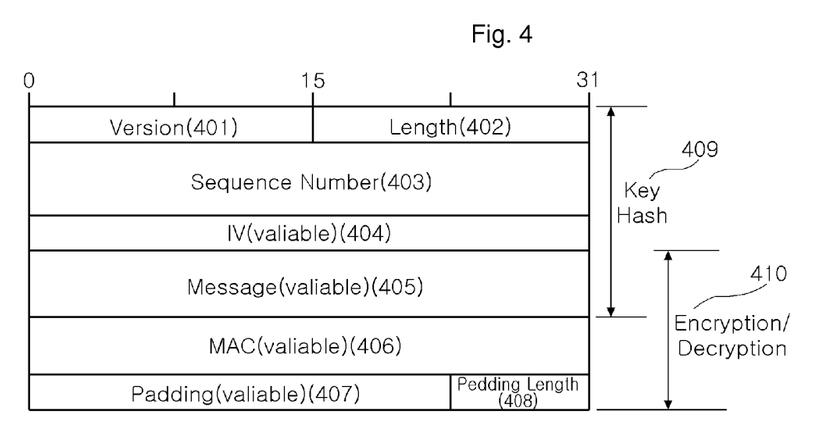
FIG. 4 illustrates a format of data that is transmitted and received according to a security policy according to an embodiment of the present invention.

FIG. 4 illustrates a format of data that is transmitted and received based on a security polity according to an embodiment of the present invention.

Specifically, Version 401 indicates a version, and Length 402 indicates a length from Sequence Number 403 to Padding Length 408. The Sequence Number 403 indicates a sequence number (8 bytes) for preventing a replay attack, and Initialization Vector (IV) 404 indicates an IV used for a block cipher algorithm. Message 405 indicates data that is practically transmitted, MAC 406 indicates a result obtained by applying the Keyed Hash, Padding 407 indicates a padding process needed for the block cipher algorithm, and Padding Length 408 indicates a padding length. Fields such as the Version to the Message 401 to 405 performs an authentication process by using Keyed Hash 409 and applies a data encryption process 410 to fields such as the Message to Padding Length 405 to 408. The used algorithms may use previously reported various algorithms.

Figure 5:
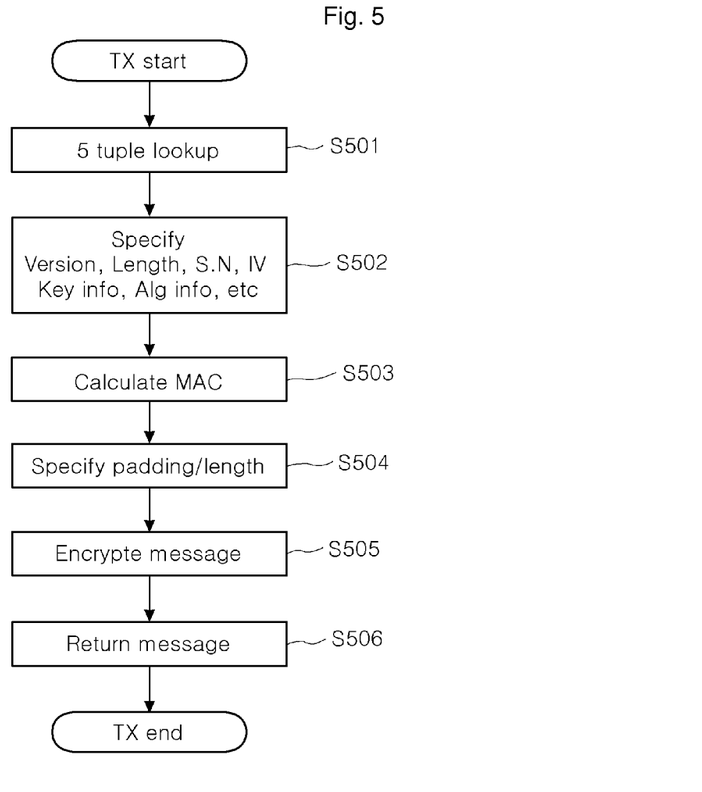
FIG. 5 illustrates a procedure of ciphering data according to an embodiment of the present invention.

FIG. 5 illustrates a procedure of ciphering data according to an embodiment of the present invention.

First, the 5-tuple lookup process is performed (operation S501), key information and algorithm information needed to practically protect data are searched for in addition to information such as Version, Length, Sequence Number, and IV as a result of the 5-tuple lookup process (operation S502).

Authentication information (MAC) is generated by using the Keyed Hash (operation S503), and Padding for ciphering data is performed after the MAC is generated (operation S504). Ciphering of data is performed (operation S505), and the ciphered data is transmitted (operation S506).

Figure 6:
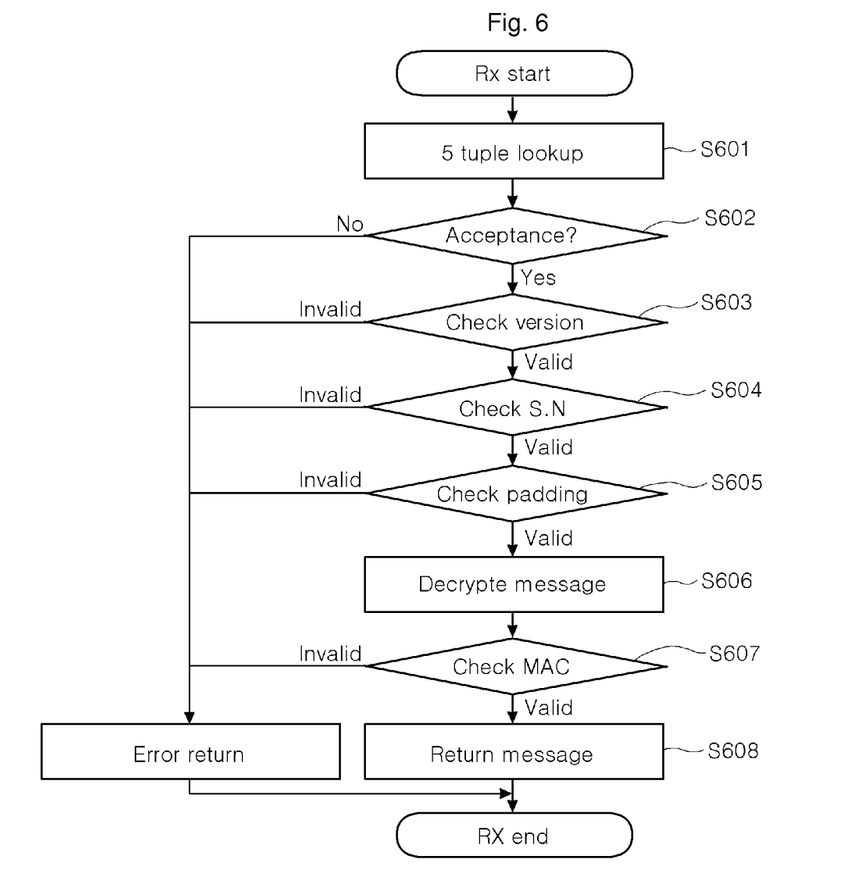
FIG. 6 illustrates a procedure of deciphering data according to an embodiment of the present invention.

FIG. 6 illustrates a procedure of deciphering data according to an embodiment of the present invention.

When receiving data, the 5-tuple lookup process is performed, and it is determined whether to receive data based on the 5-tuple lookup result (operation 602). When receiving of the data is rejected, the current process is terminated after an error message is returned and when receiving of the data is determined, a version is verified (operation 603). When the version is valid as the result of verification of the version, the Sequence Number is verified (operation 604). When the Sequence Number is valid, the Padding for deciphering data is checked (operation 605). When the Padding is valid, the data is deciphered (operation 606). Alternatively, when the Version, the Sequence Number, and the Padding are not valid, the current process is terminated after an error message is returned.

After deciphering data, an authentication process is performed by checking the MAC (operation S607). When the authentication process is successful, the current process is terminated after the deciphered data is returned. Alternatively, when the authentication process is not successful, the current process is terminated after an error message is returned.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A security method of a mobile node in a server-based mobile IP system, the security method comprising:
exchanging, between a mobile node and a server, a first security component by performing a first password-based authentication key exchange (PAK) process;
generating a first secure tunnel between the mobile node and the server;
transmitting a pseudo password query message (PPQ) from the mobile node to the server through the first secure tunnel;
generating, at the server, a pseudo password acknowledgement message (PPA) in response to the PPQ;
receiving, at the mobile node and a destination node, the PPA from the server;
exchanging, between the mobile node and the destination node, a second security component by performing a second PAK process using the PPA; and
generating a second secure tunnel between the mobile node and the destination node for transmitting and receiving data and a control message,
wherein generating the first secure tunnel comprises:
establishing a security policy using the first security component exchanged by performing the first PAK process; and
generating the first secure tunnel according to the established security policy,
wherein the established security policy uses a 5-tuple lookup process, and wherein key information, algorithm information, a sequence number, a life time, and a generation time are searched for as a result of the 5-tuple lookup process by using an address and a port number of a source, and an address and a port number of a destination, and a protocol number as indices.

2. The security method of claim 1, wherein exchanging the first security component comprises allowing a user to input an identification (ID) and a password.

3. The security method of claim 1, wherein the first and second security components each include a security policy for exchanging a key, authentication, and generating a secure tunnel.

4. The security method of claim 1, wherein the PPQ includes an address of the destination node.

5. The security method of claim 1, wherein establishing the first secure tunnel comprises:
exchanging, between the mobile node and the server, key information while performing a mutual authentication process and negotiating a security policy;
generating necessary keys by using the exchanged key information; and
generating the first secure tunnel using the exchanged key information and the negotiated security policy.

6. The security method of claim 1, wherein the PPA includes a pseudo ID and a pseudo password.

7. A mobile node device in a server-based mobile IP system, the mobile node device comprising:
a password-based authentication key exchange (PAK) execution module configured to generate keys by exchanging key information with a server while performing an authentication process, and negotiate a security policy; and
a security module configured to set the security policy that is negotiated with the corresponding node and applying the security policy to data according to the set security policy when transmitting the data, wherein the security module is configured to filter data by applying 5-tuple lookup process, and wherein key information, algorithm information, a sequence number, a life time, and a generation time are searched for as a result of the 5-tuple lookup process by using an address and a port number of a source, and an address and a port number of a destination, and a protocol number as indices.

8. A security method of a mobile node in a server-based mobile IP system, the security method comprising:
generating a tunnel by using security components that are exchanged by performing a password-based authentication key exchange (PAK) process with a plurality of mobile nodes;
receiving a pseudo password query message (PPQ) from at least one mobile node through the generated tunnel; and
transmitting a pseudo ID and a pseudo password in response to the PPQ, the pseudo ID and pseudo password being generated by using as a random number,
wherein generating the tunnel comprises establishing a security policy using the security components exchanged by performing the first PAK process and generating the tunnel according to the established security policy, and
wherein the established security policy uses a 5-tuple lookup process, and wherein key information, algorithm information, a sequence number, a life time, and a generation time are searched for as a result of the 5-tuple lookup process by using an address and a port number of a source, and an address and a port number of a destination, and a protocol number as indices.

9. The security method of claim 8, wherein the PAK process comprises allowing a user to input an ID and a password.

10. The security method of claim 8, wherein the PPQ includes an address of a second mobile node with which a first mobile node is to communicate.

11. The security method of claim 10, further comprising transmitting the pseudo password to the address of the second mobile node.

12. The mobile node device of claim 7, wherein the security module is included in a Layer 2 network device driver.

13. The mobile node device of claim 7, wherein the security module includes a security policy database and a security association database.

14. The security method of claim 1 wherein the PPQ includes an internet protocol (IP) address of the destination node.

* * * * *